(Model.)

5 Sheets—Sheet 1.

W. H. PARRISH.
COMBINED HEADER AND THRASHER.

No. 269,701. Patented Dec. 26, 1882.

Attest:
H. L. Pennie
Wm. G. Henderson

Inventor
Wm. H. Parrish.
By H. T. Abbot.
Ass. Atty.

N. PETERS, Photo-Lithographer, Washington, D. C.

(Model.) W. H. PARRISH. 5 Sheets—Sheet 3.
COMBINED HEADER AND THRASHER.
No. 269,701. Patented Dec. 26, 1882.

(Model.)

W. H. PARRISH.
COMBINED HEADER AND THRASHER.

No. 269,701. Patented Dec. 26, 1882.

Attest:
H. L. Perrine
Wm. G. Henderson

Inventor.
Wm. H. Parrish.
By H. T. Abbot
Asso Atty

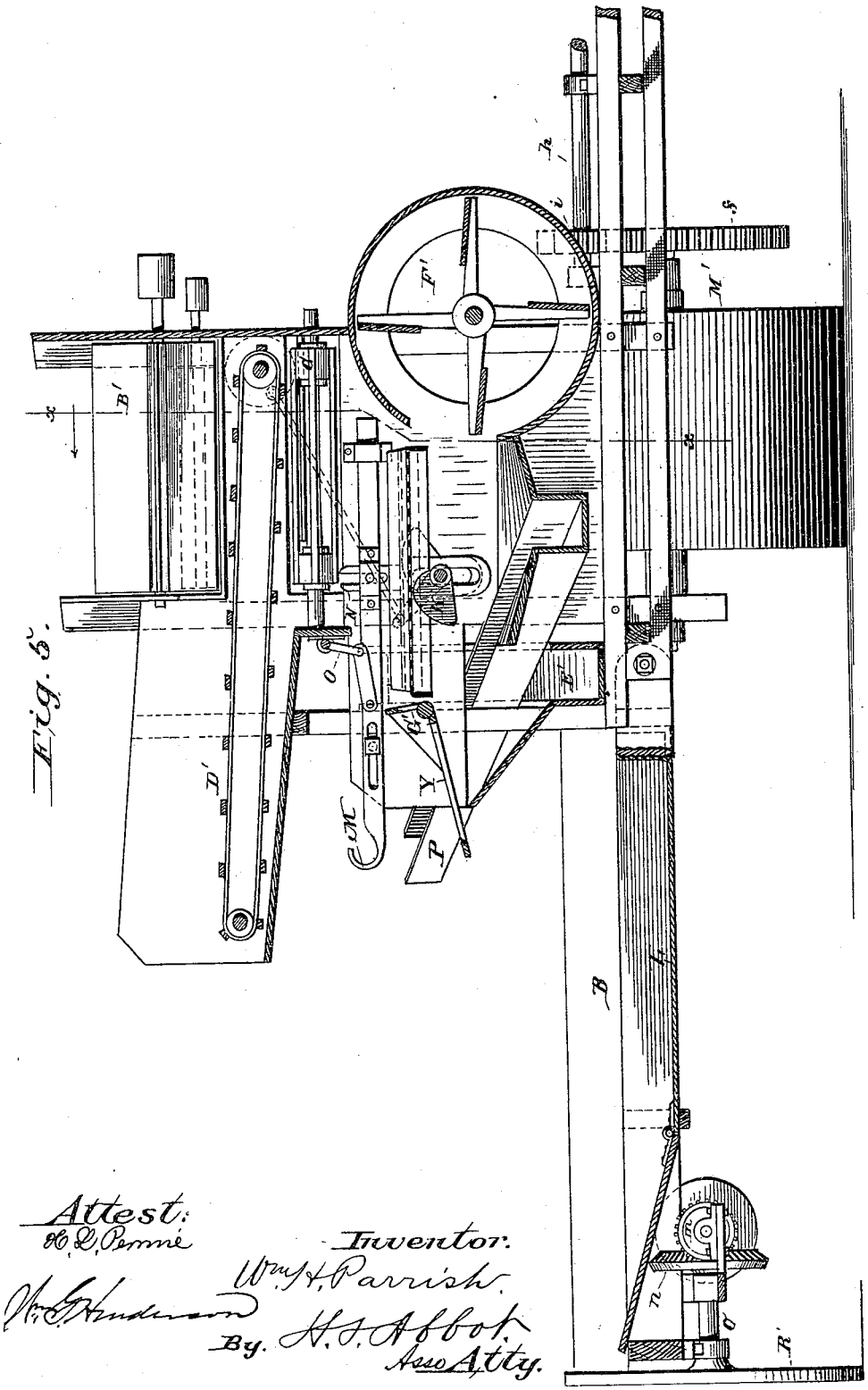

UNITED STATES PATENT OFFICE.

WILLIAM H. PARRISH, OF SALEM, OREGON, ASSIGNOR OF ONE-HALF TO GEO. E. AIKEN, OF SAME PLACE.

COMBINED HEADER AND THRASHER.

SPECIFICATION forming part of Letters Patent No. 269,701, dated December 26, 1882.

Application filed July 27, 1880. (Model.)

*To all whom it may concern:*

Be it known that I, WILLIAM H. PARRISH, of the city of Salem, in the county of Marion and State of Oregon, have invented certain new and useful Improvements in a Combined Header and Thrasher; and I do hereby declare the following to be a full, clear, and exact description of the invention, such as will enable others skilled in the art to which it appertains to make and use it, reference being had to the accompanying drawings, which form a part of this specification.

My invention relates to that class of machines wherein the grain is cut, thrashed, and separated by continuous successive steps in one machine. The objections heretofore urged against this class of machines have been that they were cumbersome and complicated, requiring too much power to operate them, and the services of skilled men and many assistants to render them serviceable. I claim to have overcome these objections, and to have produced a light machine of easy operation, and requiring the services of but two men of ordinary intelligence to successfully operate it.

My invention is hereinafter fully described in connection with the accompanying drawings, and is particularly pointed out in the claims.

Figure 1:
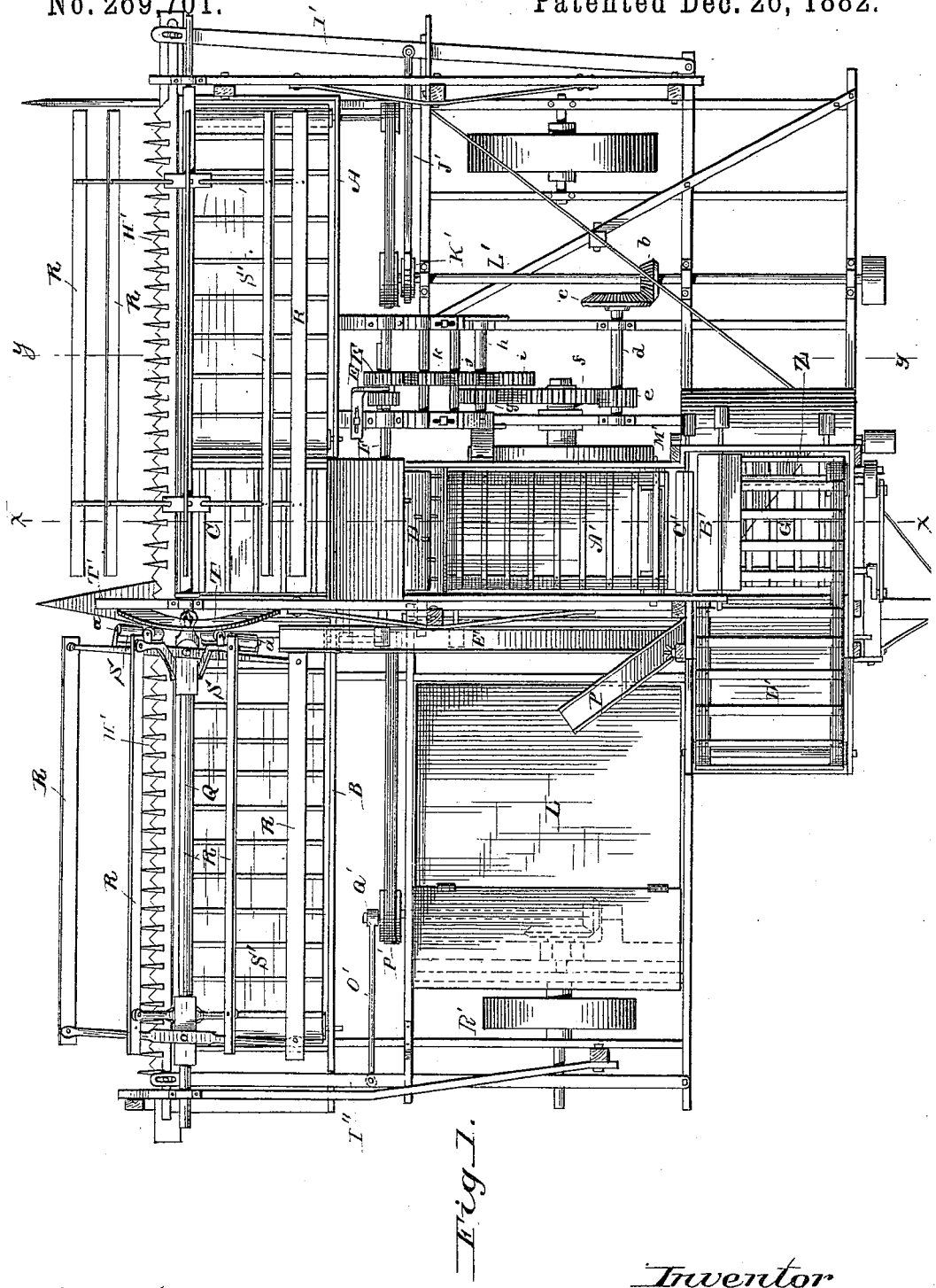
Figure 2:
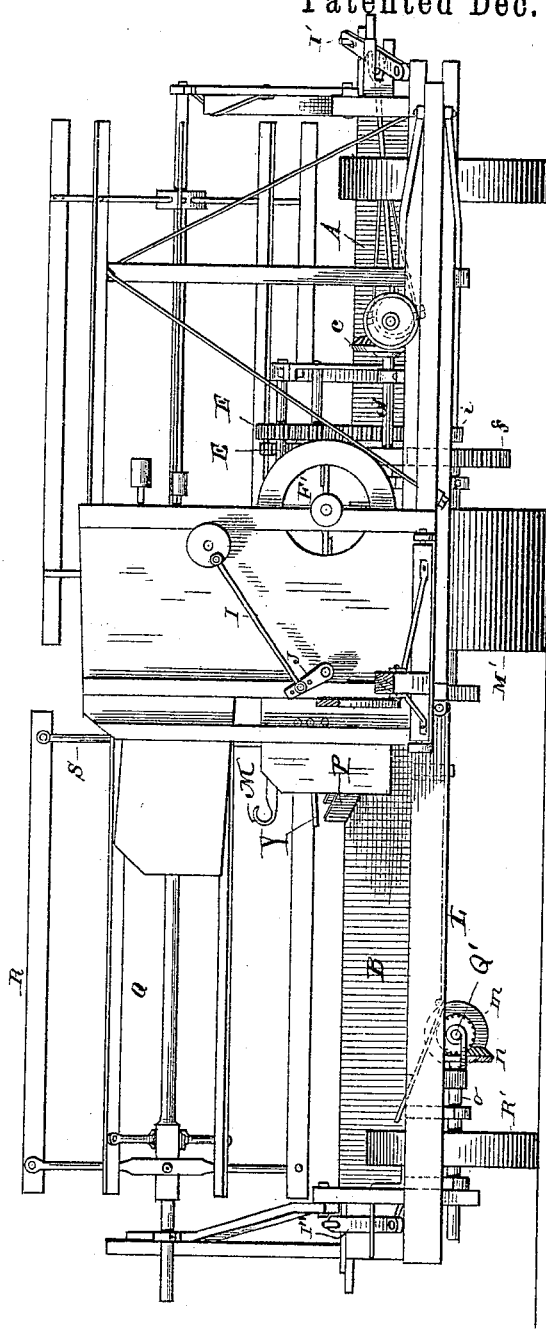
Figure 3:
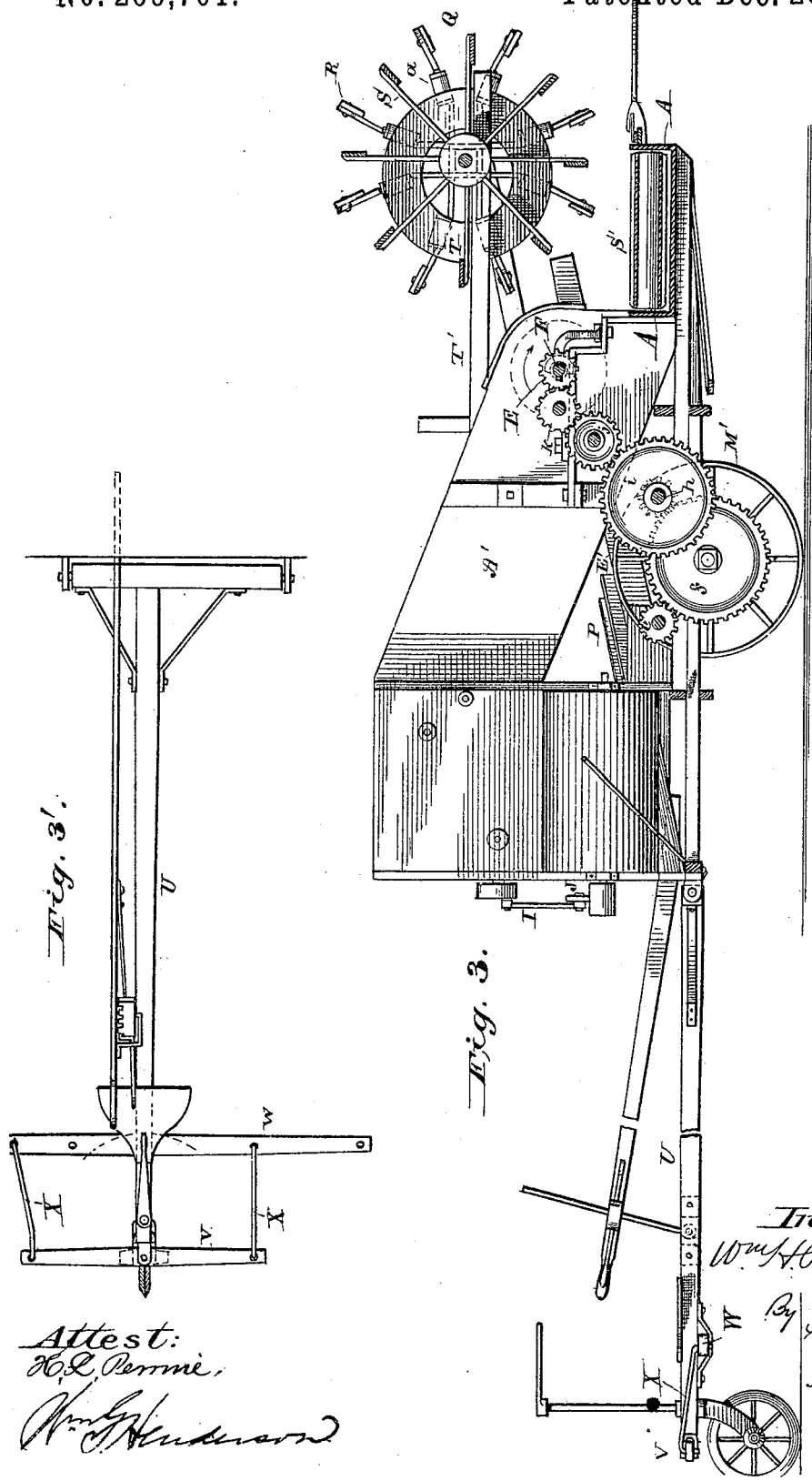
Figure 4:
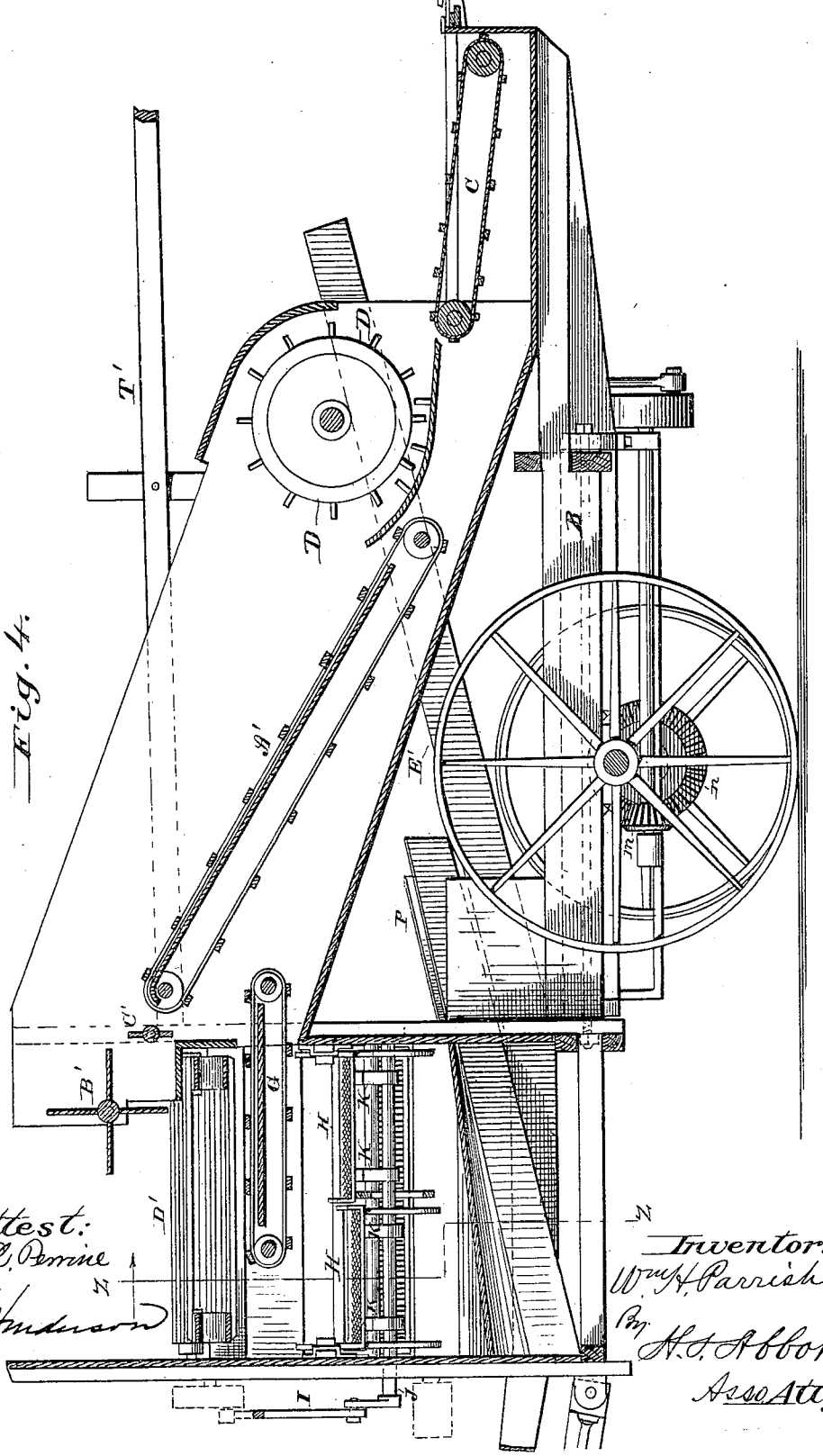

Referring to the drawings, Figure 1 is a plan view of the header, thrasher, and separator; Fig. 2, a rear elevation; Fig. 3, a vertical longitudinal section through line $y\,y$ of Fig. 1; Fig. $3^1$, a plan of the pushing-pole; Fig. 4, a vertical longitudinal section through $x\,x$ of Figs. 1 and 5, and Fig. 5 a cross section through $z\,z$ of Fig. 4.

The front cutting-sections, A and B, are jointed at their center, so as to adjust themselves to the inequalities of the ground, and to allow of detaching the section B from the machine to reduce its width of cut, and for the purpose of moving over narrow roads and bridges and through gates. The sections A and B are provided with canvas drapers S', as usual, for the purpose of conveying the grain to the self-feeder C, where it is received by the cylinder D, which is driven at two speeds by means of the spur-pinions E E, of different sizes, upon the cylinder-shaft F. The grain is carried by the conveyer A' up the trough behind the cylinder D, where it is received by the beater B' and picker C', and the waste straw, being tossed upon the straw-carrier D', placed, as shown, at right angles with the machine and over the riddles and the fan F', is carried clear of the machine, and the residue, consisting of kernels, heads of grain, and some chaff, falls upon the conveyer G, which carries it and deposits it upon the riddles, constructed in two sections, H H. The triangular board Z is placed at the angle formed by the junction of the cylinder-trough and separator proper.

The riddle-sections H H have a constant vibration or shake imparted to them by the crank shaft I operating the cross-shaft J, having upon it the knuckles K K K K, which are so arranged upon the shaft that a regular and alternate shake is imparted to the riddle-sections H H. These riddle-sections are maintained at a level position at the will of the sack-tender standing upon the platform L by a hand-lever, M, which is attached by slotted holder N, connecting it with the left-hand riddle-section H. Also, the lever M is connected to the crank-shaft O, placed above the riddle-sections H H, which at its farther end is attached to right-hand riddle, H, by a duplicate of the lever M. The hand-lever M, being operated by the sack-tender from the platform, enables him to maintain the riddle-sections perfectly level.

The grain is dropped into the spout P, conveniently placed directly beneath and extending from extreme front end to extreme rear end of the riddles, and extending across a "tailings" spout, E', at the departure of both from the machine, thus economizing space in the arrangement of the bottom of the separator. The grain is discharged from the spout P into sacks, which are cared for by the sack-tender stationed upon the platform L.

The reel Q, having the slats R and the arms S, provided with friction-rollers $a$, is, when section B is pitched up and down upon uneven ground, made laterally adjustable by pressing against the circular rim T, attached to the left-hand reel-stay, T', of section A.

The pushing-pole U is provided with a draft attachment consisting of the bars V W, connected together by the chains or rods X X.

The letter Y indicates the straw-rake, having the tailings-board G' attached thereto, as shown.

The knives H' are along the front edge of the two sections, and are connected each at one end to pivoted levers I' I''. The knife along section A is operated through rod J', connected to eccentric K', which is on shaft L', which is rotated by pinion $b$ thereon and gear $c$ on shaft $d$, which shaft is rotated by pinion $e$ on the end thereof, that pinion meshing with gear-wheel $f$ on the shaft of the main drive-wheel M'. The wheel $f$ meshes with pinion $g$ on shaft $h$, whereby the gears $i$ $j$, $k$, and E, which mesh with one another, are operated. The knife on front of section B is operated by the lever I'', which is reciprocated by the rod O', connected to eccentric P', which is on shaft Q'; that shaft being provided with a pinion, $m$, which meshes with gear $n$ on the shaft $o$, which is turned by wheel R', which rests upon the ground.

I have fully described the construction of the separator, so as to illustrate the successive working of the several parts from the cutting of the grain to its final cleaning or separation from the chaff; but I do not herein claim the details of construction of the separator, as they will form the subject of another application.

I do not claim broadly a harvester made in two sections from front to rear and hinged together.

I do not in this application desire to claim the combination of a trough, a separator at the top of and at right angles to said trough, a platform located in the angle formed by said trough and separator, and a trough for delivering the grain from the separator to the platform, with a pole pivoted to the front and side of the machine at its rear end to lever E F, this matter being the subject of a claim in an application filed by me May 26, 1880.

Having fully described my invention, what I claim as new, and desire to secure by Letters Patent, is—

1. In a header and thrasher having a conveyer, A', and straw-carrier D', arranged at right angles to each other, a platform, L, located at the angle of the conveyer-trough and supporting-frame of straw-carrier D, whereby the attendant may be within reach and view of the operating parts of the machine, as set forth.

2. The combination, with section A and a rim, T, attached to the reel-stay thereof, of section B, having a sickle and draper, and a laterally-adjustable reel, Q, the sections A and B being hinged together, so that when section B is raised its reel will come in contact with rim T of section A and be thereby adjusted, as set forth.

3. The combination of sections A and B, provided with drapers S', feeder C, and cylinder D, located at the junction of the sections, so as to receive the cut grain from both drapers, substantially as set forth.

4. The laterally-adjustable reel Q, having slats R and arms S, provided with friction-rollers $a$, in combination with circular rim T, attached to the reel-stay F of section A, substantially as set forth.

In testimony that I claim the foregoing I have hereunto set my hand and seal this 13th day of May, 1880.

WILLIAM H. PARRISH. [L. S.]

Witnesses:
HUGH J. CORCORAN,
ELIHU B. STOWE.